(12) United States Patent
Uemura

(10) Patent No.: US 7,673,529 B2
(45) Date of Patent: Mar. 9, 2010

(54) METHOD FOR PROCESSING DETECTION SIGNAL OF VIBRATORY INERTIAL FORCE SENSOR AND VIBRATORY INERTIAL FORCE SENSOR

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 137 days.

(21) Appl. No.: 12/065,200

(22) PCT Filed: Oct. 10, 2006

(86) PCT No.: PCT/JP2006/320164

§ 371 (c)(1),
(2), (4) Date: Feb. 28, 2008

(87) PCT Pub. No.: WO2007/043503

PCT Pub. Date: Apr. 19, 2007

(65) Prior Publication Data

US 2009/0145224 A1     Jun. 11, 2009

(30) Foreign Application Priority Data

Oct. 11, 2005    (JP) ................................ 2005-296283

(51) Int. Cl.
*G01C 19/56*    (2006.01)
(52) U.S. Cl. .................. 73/862.59; 73/504.16
(58) Field of Classification Search ............... 73/504.16, 73/862.59
See application file for complete search history.

(56) References Cited

U.S. PATENT DOCUMENTS

| 6,220,094 | B1 * | 4/2001 | Ichinose et al. | 73/504.16 |
| 6,244,095 | B1 * | 6/2001 | Nozoe et al. | 73/1.82 |
| 6,345,533 | B1 * | 2/2002 | Nozoe | 73/504.12 |
| 6,386,034 | B1 * | 5/2002 | Nozoe | 73/504.12 |
| 7,068,744 | B2 * | 6/2006 | Watanabe | 375/346 |
| 7,520,184 | B2 * | 4/2009 | Uemura et al. | 73/862.326 |
| 7,533,568 | B2 * | 5/2009 | Murakami | 73/504.16 |
| 2008/0115580 | A1 * | 5/2008 | Murakami et al. | 73/504.16 |
| 2008/0148847 | A1 * | 6/2008 | Sato et al. | 73/504.12 |
| 2009/0031807 | A1 * | 2/2009 | Sugibayashi | 73/504.16 |
| 2009/0165555 | A1 * | 7/2009 | Uemura | 73/504.12 |

FOREIGN PATENT DOCUMENTS

| JP | 10-009872 | 1/1998 |
| JP | 11-083495 | 3/1999 |
| JP | 11-258355 | 9/1999 |
| JP | 2002-267448 | 9/2002 |

OTHER PUBLICATIONS

International Search Report for PCT/JP2006/320164; Nov. 2, 2006.

* cited by examiner

*Primary Examiner*—Lisa M Caputo
*Assistant Examiner*—Freddie Kirkland, III
(74) *Attorney, Agent, or Firm*—Pearne & Gordon LLP

(57) ABSTRACT

A method for processing a detection signal of a vibratory inertial force sensor is disclosed. This method improves detection accuracy of the vibratory inertial force sensor. A detection circuit of the vibratory inertial force sensor removes harmonic component from signals synchronously wave-detected, and amplifies the resultant signals, and then smoothes the amplified signals. A vibratory inertial force sensor adopting this method is also disclosed.

2 Claims, 6 Drawing Sheets

METHOD FOR PROCESSING DETECTION SIGNAL OF VIBRATORY INERTIAL FORCE SENSOR AND VIBRATORY INERTIAL FORCE SENSOR

TECHNICAL FIELD

The present invention relates to a method for processing a detection signal of vibratory inertial force sensor, and it also relates to a vibratory inertial force sensor adopting the same method.

BACKGROUND ART

FIG. 6 shows a block diagram of a vibratory angular velocity sensor, one of conventional vibratory inertial force sensors, and the vibratory angular velocity sensor comprises the following elements:
  sensor element 203 including driver section 201 and sensor section 202;
  drive control circuit 204 for applying a control voltage to driver section 201, thereby vibrating sensor element 203, and then controlling the vibration; and
  detection circuit 205 for processing a detection signal supplied from sensor section 202.

In detection circuit 205, the detection signal supplied from sensor section 202 is differentially amplified by differential amplifier 206. The amplified signal and an inverted signal of the detection signal inverted by inverting amplifier 207 are synchronously wave-detected by synchronous wave detector 208. Then the resultant signal is smoothed by low-pass filter 209, so that the signal with disturbance noise, such as external impact, suppressed is output.

Conventional low-pass filter 209 firstly amplifies the signal having undergone the synchronous wave-detection with inverting amplifier 220 working as a pre-amplifier, then smoothes the resultant signal with smoothing circuit 221, or the signal is amplified and smoothed at the same time by an active filter (not shown).

The foregoing conventional vibratory inertial force sensor is disclosed in, e.g. Unexamined Japanese Patent Publication No. 2002-267448.

The signal having undergone the synchronous wave-detection in wave detector 208 of conventional vibratory inertial force sensor; however, draws a saw-tooth waveform as drawn by synchronous wave-detection output 208a shown in FIG. 7. At switchover section 210 of this waveform, the amplifying capacity of inversing amplifier 220 or the active filter working as a pre-amplifier of the low-pass filter cannot fully track the saw-tooth waveform, so that the waveform actually drawn by output 220a from the inversing amplifier becomes as shown in FIG. 7. In FIG. 7, the horizontal axis represents a time, and the vertical axis represents an electrical potential of respective output signals.

As shown in FIG. 7, output 220a supplied from the inverting amplifier and having undergone the amplification includes waveform error 212 which causes offset 211 at sensor output 205a having undergone the smoothing. Smoothing circuit 221 of low-pass filter 209 thus cannot implement an accurate smoothing process, so that the performance of the vibratory inertial force sensor is obliged to lower due to internal process within detection circuit 205.

DISCLOSURE OF INVENTION

The present invention addresses the problem discussed above, and aims to provide a method for improving detection accuracy in processing a detection signal of vibratory inertial force sensor, and it also aims to provide a vibratory inertial force sensor adopting the same method.

To achieve this objective, the present invention adopts the following method: in a detection circuit, among others, of the vibratory inertial force sensor, a signal having undergone the synchronous detection is removed harmonic component, and the resultant signal is amplified and then smoothed. Use of this method allows improving detection accuracy of the vibratory inertial force sensor.

Figure 1:
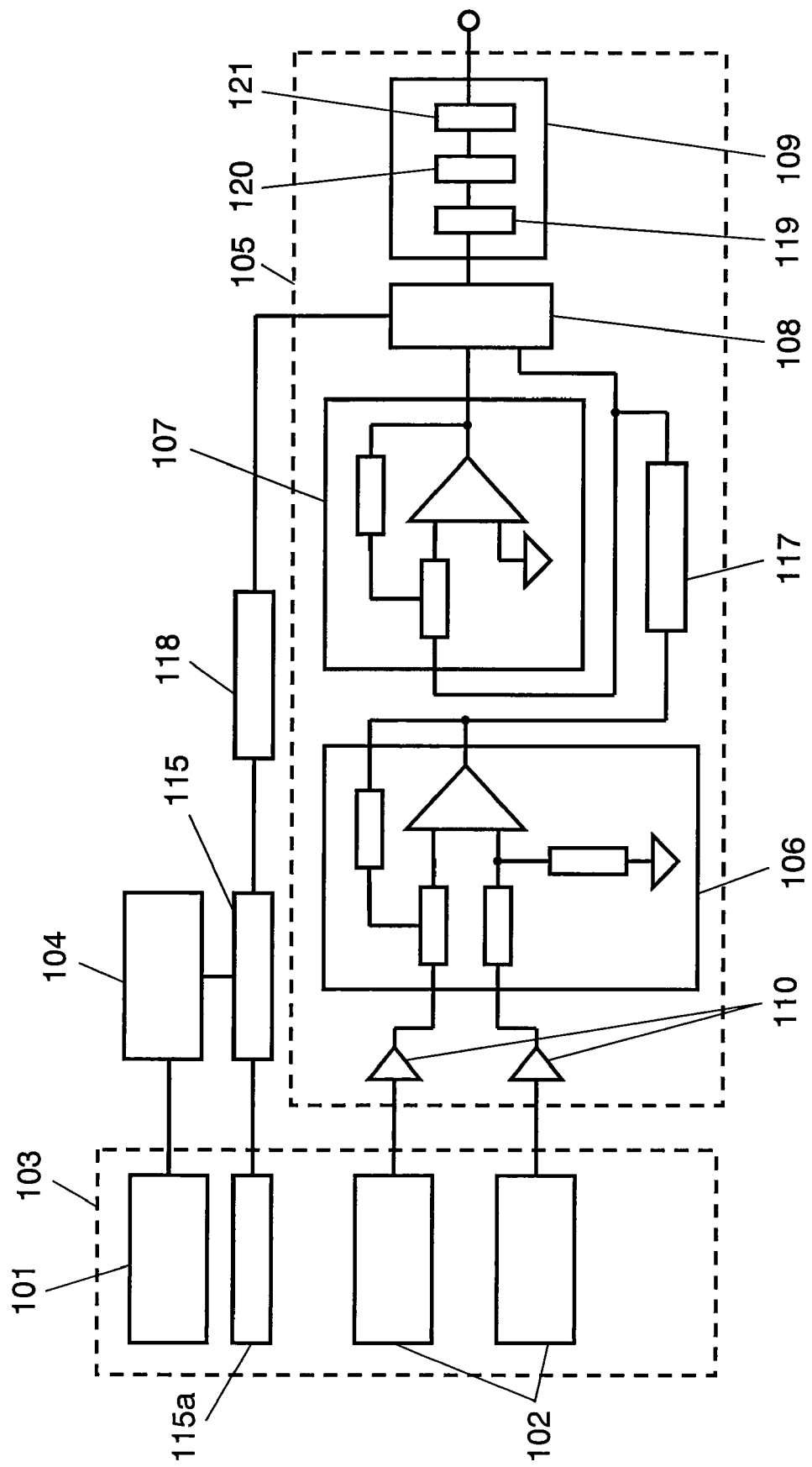
FIG. 1 shows a block diagram of a vibratory inertial force sensor in accordance with an exemplary embodiment of the present invention.

DESCRIPTION OF REFERENCE MARKS 101 driver section
102 sensor section
103 sensor element
104 drive control circuit
105 detection circuit
114 drive arm
115 monitor

PREFERRED EMBODIMENT OF THE INVENTION

An exemplary embodiment of the present invention is demonstrated hereinafter with reference to the accompanying drawings. FIG. 1 shows a block diagram of a vibratory angular velocity sensor as an example of a vibratory inertial force sensor of the present invention. This vibratory angular velocity sensor basically comprises the following elements:
  sensor element 103;
  drive control circuit 104 for controlling the vibration of sensor element 103; and
  detection circuit 105 for processing a signal supplied from sensor element 103.

Figure 2:
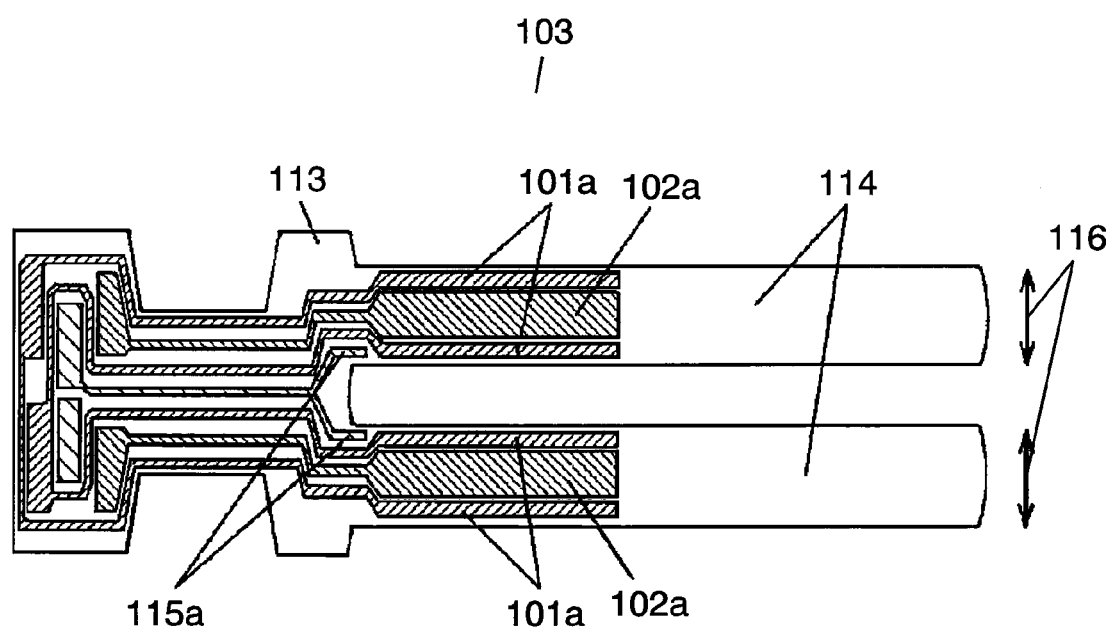
FIG. 2 shows a top view of a sensor element to be used in the vibratory inertial force sensor.

FIG. 2 shows a top view detailing the structure of sensor element 103 to be used in the vibratory angular velocity sensor of the present invention. As shown in FIG. 2, sensor element 103 comprises the following elements:
  fork oscillator 113 made from silicone substrate;
  a pair of drive arms 114 extending from fork oscillator 113;
  drive electrodes 101a working as driver section 101 formed of piezoelectric thin film made from PZT (lead zirconium titante) sandwiched by electrodes 101a at its upper and lower faces and disposed on arms 114;

sensor electrodes 102a working as sensor section 102 and disposed on arms 114; and monitor electrodes 116a formed by sandwiching the piezoelectric thin film made from PZT at the upper and the lower faces with electrodes 115a and coupled to monitor 115.

Drive control circuit 104 shown in FIG. 1 applies a drive power to drive electrodes 101a, thereby vibrating drive arms 114 to both sides as arrow marks 116 show. In this vibration state, an angular velocity around the sensing axis is applied to arms 114, so that drive arms 114 deflect along back and forth direction in FIG. 2 due to Coriolis force. The deflection allows sensor electrodes 102a to output a detection signal to detection circuit 105 shown in FIG. 1.

A drive power applied from drive control circuit 104 to drive electrode 101a is adjusted so as to accomplish the following performance: Each one of monitor electrodes 115a shown in FIG. 2 senses an amount of amplitude of drive arms 114, and feeds back this information to drive control circuit 104 via monitor 115, so that the amount of amplitude becomes a specified state.

Figure 3:
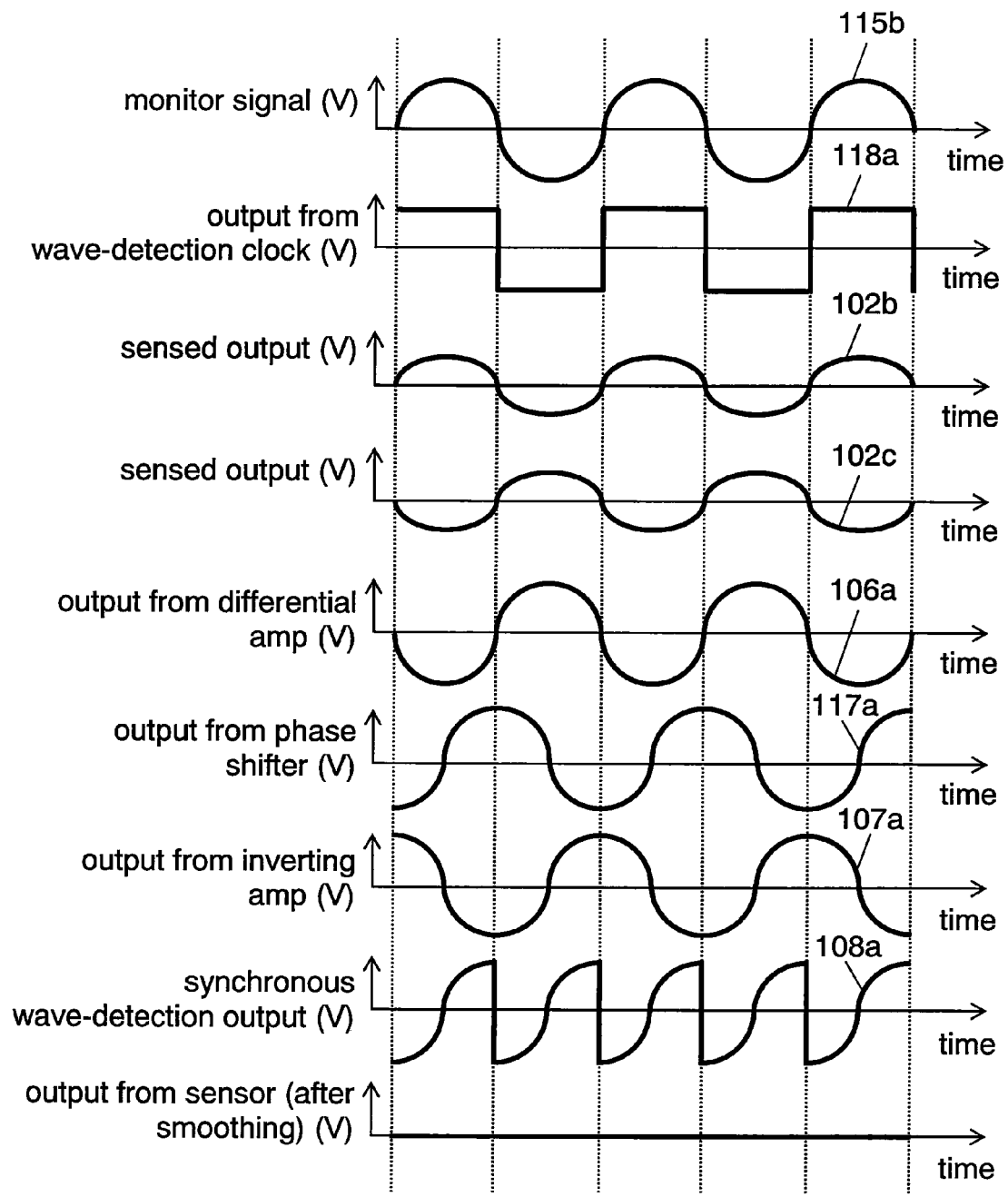
FIG. 3 shows transition of waveforms detected by the vibratory inertial force sensor.
Figure 4:
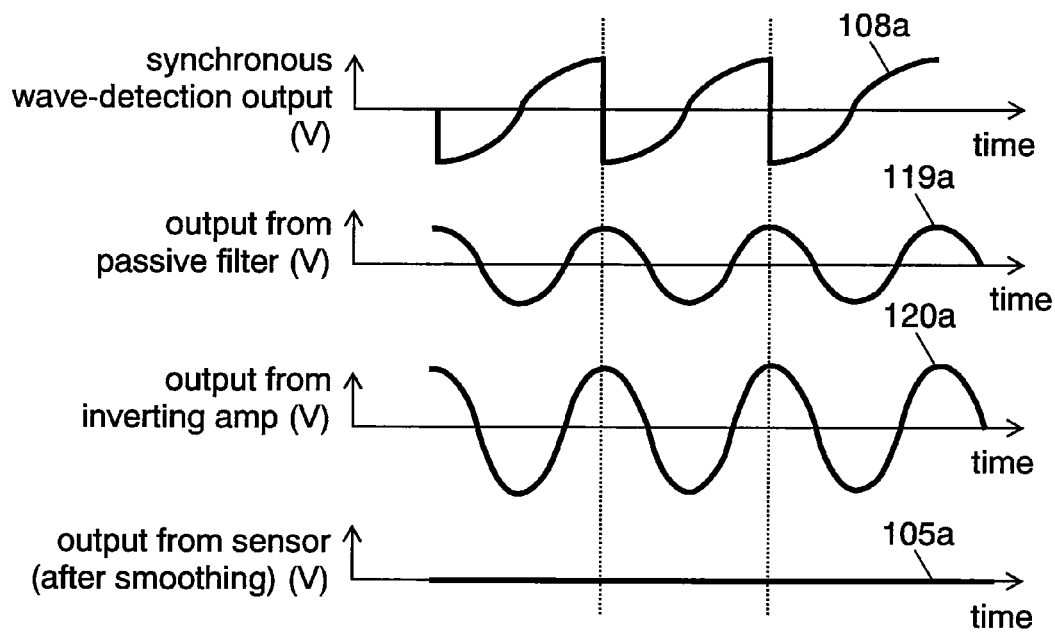
FIG. 4 shows transition of waveforms detected by the vibratory inertial force sensor and processed after synchronous wave-detection.
Figure 5:
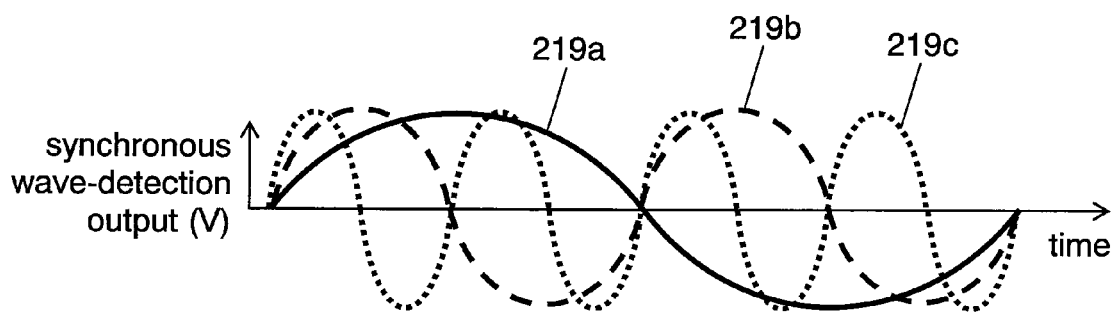
FIG. 5 schematically illustrates waveform components after the synchronous wave-detection.

FIG. 3 shows transition of waveforms of respective signals in the vibratory angular velocity sensor in accordance with this embodiment. In FIG. 3, the horizontal axis represents a time, and the vertical axis represents an electric potential of respective signals. FIGS. 4 and 5 use the same system as FIG. 3.

In detection circuit 105 shown in FIG. 1, detection signals (sensed outputs 102b, 102c shown in FIG. 3) supplied from two sensor electrodes 102a disposed at sensor element 103 are amplified by amplifier 110 formed of a current amplifier or a charge amplifier. Then the two amplified signals are differentially amplified by differential amplifier 106, and the resultant signals are delayed their phase by 90 degrees by phase shifter 117 with respect to these resultant signals (output 106a from the differential amplifier shown in FIG. 3) having undergone the differential amplification. The phase-delayed signal (output 117a from the phase shifter shown in FIG. 3) is branched, and a first branched signal is fed directly into synchronous detector 108, and a second branched signal is reversed the phase by inverting amplifier 107 before the resultant signal (output 107a from the inverting amplifier shown in FIG. 3) is fed into synchronous wave detector 108.

Wave detector clock section 118 converts monitor signal 115b supplied from monitor 115 into wave-detection CLK output 118a drawing a pulse waveform (an output from the wave detector clock section) shown in FIG. 3. Then in synchronous wave detector 108, those two input signals (output 117a from the phase shifter and output 107a from the inverting amplifier shown in FIG. 3) are wave-detected by output 118a from wave detector clock section 118, thereby forming synchronous wave detection output 108a drawing a saw-tooth waveform shown in FIG. 3.

Figure 7:
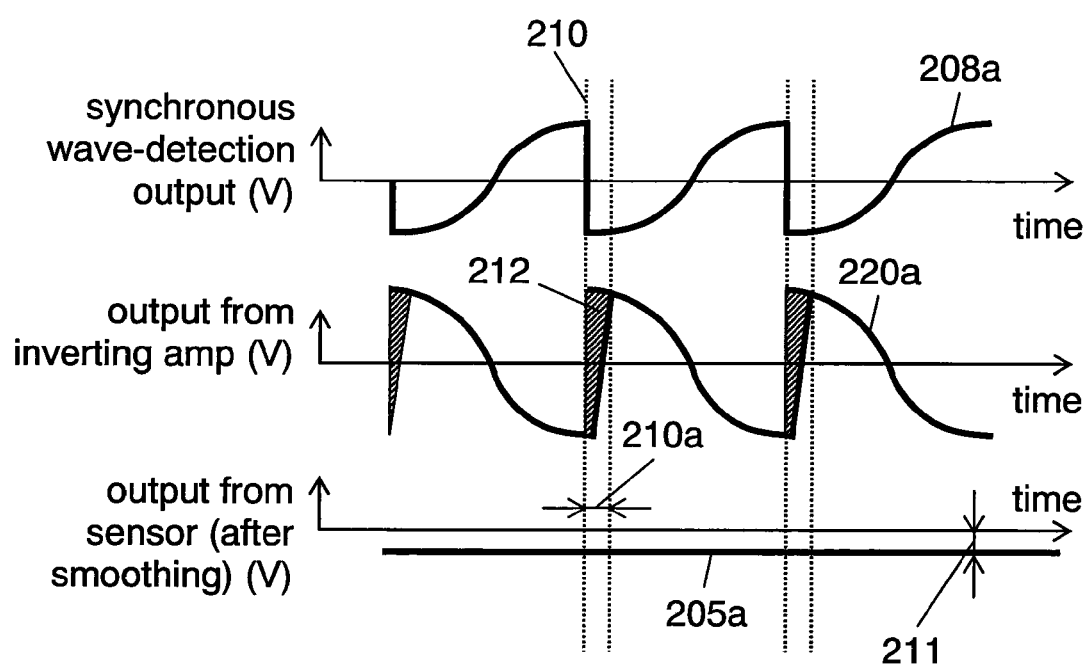
FIG. 7 shows transition of a waveform after the synchronous detection in the conventional vibratory inertial force sensor.

This vibratory angular velocity sensor has low-pass filter 109 shown in FIG. 1 and which filter 109 smoothes saw-tooth synchronous wave-detection output 108a. Low-pass filter 109 works in the following manner: synchronous wave-detection output 108a undergoes passive filter 119 for removing the harmonic component, then is smoothed by smoothing circuit 121 such as an integrator. This mechanism allows suppressing a reduction in detection accuracy of detection circuit 105 comparing with the conventional one shown in FIG. 7, where synchronous wave-detection output 208a is firstly amplified, and then smoothed. As a result, the detection accuracy of the vibratory inertial force sensor can be improved. In the meantime, the passive filter discussed above is a filter formed of passive components only, such as capacitors, resistors and so on.

To be more specific, the conventional pre-amplifier or active filter firstly amplifies and then smoothes synchronous wave-detection output 208a, i.e. saw-tooth shaped output 208a is amplified by the pre-amp or the active filter, thereby incurring time lag 210a at a switchover section of the waveform due to the poor tracking ability of the amplifier. As a result, waveform error 212 is generated between an actual waveform and the amplified waveform. The actual waveform with error 212 is smoothed, thereby producing offset 211 in the output.

Figure 6:
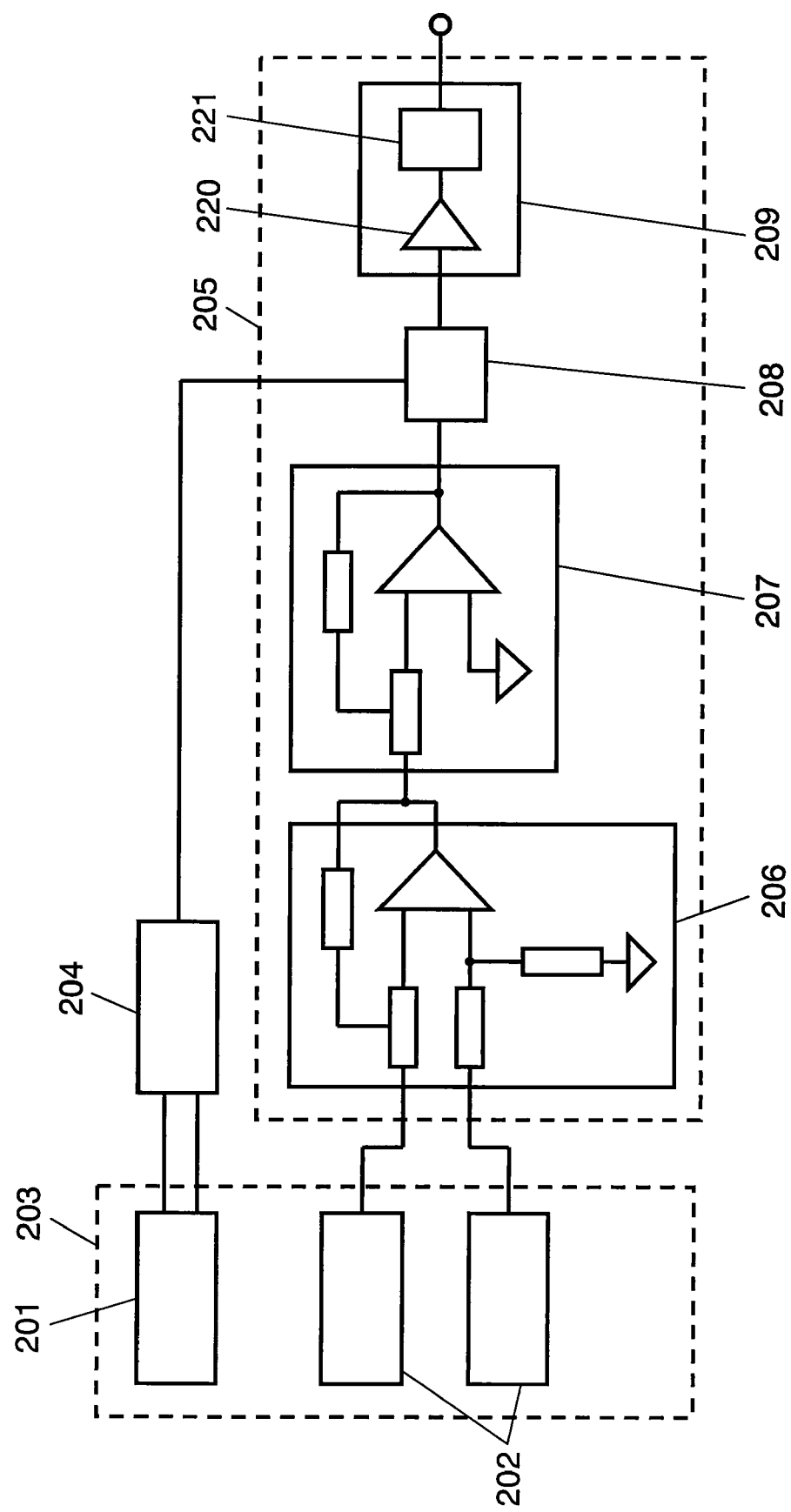
FIG. 6 shows a block diagram of a vibratory angular velocity sensor as an example of a conventional vibratory inertial force sensor.

However, synchronous wave-detection output 108a or 208a supplied from synchronous wave detector 108 shown in FIG. 1 or wave detector 208 shown in FIG. 6 includes secondary harmonic component 219b and tertiary harmonic component 219c on top of fundamental harmonic component 219a shown in FIG. 5. Therefore, as shown in FIG. 4, synchronous wave-detection output 108a is fed into passive filter 119 for removing the harmonic component, and then the resultant output 119a is supplied, which output 119a contains only sine-wave like moderately curved fundamental component 219a. This output 119a supplied from passive filter 119 is amplified by amplifier 120, and the resultant output 120a is smoothed by smoothing circuit 121. The foregoing process allows the output from the vibratory angular velocity sensor to become sensor output 105a as shown in FIG. 4, which output 105a includes no waveform error 212 shown in FIG. 6, so that the production of offset 211 can be suppressed. As a result, the reduction in detection accuracy of detection circuit 105 can be suppressed, and improvement in the detection accuracy of the vibratory inertial force sensor can be expected.

Passive filter 119 that removes harmonic component from detection signals has the following structure although not shown in a drawing specifically: resistors in series with respect to a path of the detection signal, and a capacitor is placed between at least one end of the resistors and a reference electric potential. In other words, a typical harmonic suppressing circuit can work as passive filter 119.

In the foregoing embodiment, the vibratory angular velocity sensor is taken as an example of the vibratory inertial force sensor; however, the present invention is not limited to this example. Any structure that senses inertial force, such as acceleration, by vibrating the drive arm can produce a similar advantage to what is discussed previously.

INDUSTRIAL APPLICABILITY

The present invention allows a vibratory inertial force sensor to achieve higher detection accuracy, so that it is useful for electronic apparatuses requiring a highly accurate sensor of inertial force among others. The present invention is thus well applicable to the industrial use.

The invention claimed is:

1. A method for processing a detection signal of vibratory inertial force sensor, which sensor comprises:
   a drive arm;
   a driver disposed to the drive arm for vibrating the drive arm;
   a sensor section for generating a detection signal through deflection produced by inertial force applied to the drive arm;
   a monitor for monitoring the vibration of the drive arm;
   a drive control circuit for controlling an amount of vibration of the drive arm; and a detection circuit for processing the detection signal, the method, to be implemented in the detection circuit, comprising the steps of:

differentially amplifying two detection signals detected by the sensor section and having a phase difference of 180 degrees;

synchronously wave-detecting the differentially amplified signals with a monitor signal supplied from the monitor;

removing harmonic component from the signals synchronously wave-detected;

amplifying the signals from which the harmonic component is removed; and then smoothing the amplified signals.

2. A vibratory inertial force sensor comprising:

a drive arm;

a driver disposed to the drive arm for vibrating the drive arm;

a sensor section for generating a detection signal through deflection produced by inertial force applied to the drive arm;

a monitor for monitoring the vibration of the drive arm;

a drive control circuit for controlling an amount of vibration of the drive arm; and a detection circuit for processing the detection signal, wherein, the detection circuit differentially amplifies two detection signals detected by the sensor section and having a phase difference of 180 degrees, and synchronously wave-detects the differentially amplified signals with a monitor signal supplied from the monitor, removes harmonic component from the signals synchronously wave-detected, amplifies the signals from which the harmonic component is removed, and then smoothes the amplified signals.

* * * * *